(12) United States Patent
McCrea et al.

(10) Patent No.: US 10,272,283 B2
(45) Date of Patent: Apr. 30, 2019

(54) HANDLE

(71) Applicant: JMC ENGINEERING LLC, San Carlos, CA (US)

(72) Inventors: James Anthony McCrea, San Carlos, CA (US); Charles Westhorpe Pederson, San Carlos, CA (US)

(73) Assignee: JMC Engineering, LLC, San Carlos, CA (US)

( * ) Notice: Subject to any disclaimer, the term of this patent is extended or adjusted under 35 U.S.C. 154(b) by 392 days.

(21) Appl. No.: 15/241,489

(22) Filed: Aug. 19, 2016

(65) Prior Publication Data

US 2017/0056710 A1   Mar. 2, 2017

Related U.S. Application Data

(60) Provisional application No. 62/211,213, filed on Aug. 28, 2015.

(51) Int. Cl.
*A63B 21/04* (2006.01)
*A63B 21/00* (2006.01)
*A63B 21/16* (2006.01)
*G09B 19/00* (2006.01)
(Continued)

(52) U.S. Cl.
CPC ...... *A63B 21/4035* (2015.10); *A63B 21/0552* (2013.01); *A63B 21/0628* (2015.10); *A63B 21/154* (2013.01); *A63B 21/16* (2013.01); *G09B 19/0038* (2013.01); *A63B 21/0407* (2013.01); *A63B 21/0442* (2013.01); *A63B 21/0555* (2013.01); *A63B 21/0557* (2013.01); *A63B 21/151* (2013.01); *A63B 21/169* (2015.10); *A63B 21/1609* (2015.10); *A63B 21/1618* (2013.01); *A63B 21/1627* (2013.01); *A63B 21/4011* (2015.10); *A63B 21/4013* (2015.10); *A63B 21/4015* (2015.10); *A63B 21/4017* (2015.10); *A63B 21/4019* (2015.10); *A63B 21/4021* (2015.10); *A63B 21/4039* (2015.10);
(Continued)

(58) Field of Classification Search
CPC .............. A63B 21/154; A63B 21/0407; A63B 21/0442; A63B 21/0552; A63B 21/0555; A63B 21/0557; A63B 21/0628; A63B 21/15; A63B 21/151–21/157; A63B 21/16; A63B 21/1609; A63B 21/1618; A63B 21/1627; A63B 21/169; A63B 21/4011; A63B 21/4013; A63B 21/4015; A63B 21/4017; A63B 21/4019; A63B 21/4021; A63B 21/4035; A63B 21/4039; A63B 21/4049; A63B 23/03508; A63B 23/03533; A63B 23/0405; A63B 23/047; A63B 23/1209; A63B 23/14; A63B 26/003; A63B 69/10; A63B 69/182; A63B 71/0622; A63B 2023/006; A63B 2071/0625; A63B 2071/0694; A63B 2225/50; G09B 19/0038
See application file for complete search history.

(56) References Cited

U.S. PATENT DOCUMENTS 4,645,204 A * 2/1987 Berger ............... A63B 21/0004
482/123
5,484,368 A * 1/1996 Chang ................ A63B 21/0004
482/122
(Continued)

*Primary Examiner* — Joshua Lee
(74) *Attorney, Agent, or Firm* — Keith Kline; The Kline Law Firm PC

(57) ABSTRACT

Handles for use in exercise apparatus and in lifting apparatus are provided.

19 Claims, 12 Drawing Sheets

(51) Int. Cl.
    *A63B 21/055* (2006.01)
    *A63B 21/062* (2006.01)
    *A63B 23/00* (2006.01)
    *A63B 23/04* (2006.01)
    *A63B 23/12* (2006.01)
    *A63B 23/14* (2006.01)
    *A63B 26/00* (2006.01)
    *A63B 69/10* (2006.01)
    *A63B 69/18* (2006.01)
    *A63B 71/06* (2006.01)
    *A63B 23/035* (2006.01)

(52) U.S. Cl.
    CPC ..... *A63B 21/4049* (2015.10); *A63B 23/03508* (2013.01); *A63B 23/03533* (2013.01); *A63B 23/0405* (2013.01); *A63B 23/047* (2013.01); *A63B 23/1209* (2013.01); *A63B 23/14* (2013.01); *A63B 26/003* (2013.01); *A63B 69/10* (2013.01); *A63B 69/182* (2013.01); *A63B 71/0622* (2013.01); *A63B 2023/006* (2013.01); *A63B 2071/0625* (2013.01); *A63B 2071/0694* (2013.01); *A63B 2225/50* (2013.01)

(56) References Cited

U.S. PATENT DOCUMENTS

| | | | |
|---|---|---|---|
| 8,845,499 B1* | 9/2014 | Boatwright | A63B 21/015 482/116 |
| 9,700,753 B1* | 7/2017 | Boatwright | A63B 21/153 |
| 2017/0282002 A1* | 10/2017 | Lee | A63B 21/0626 |

\* cited by examiner

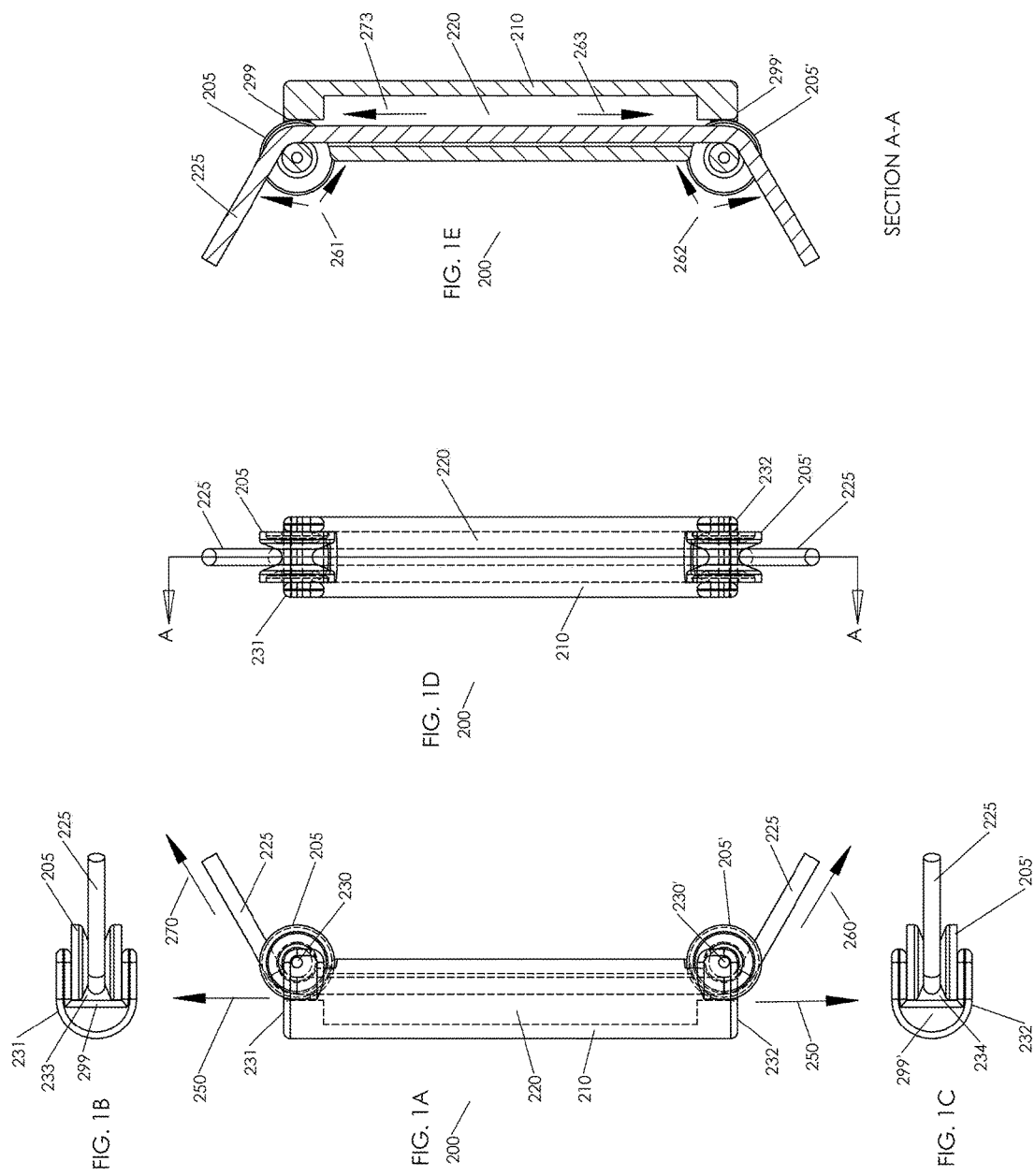

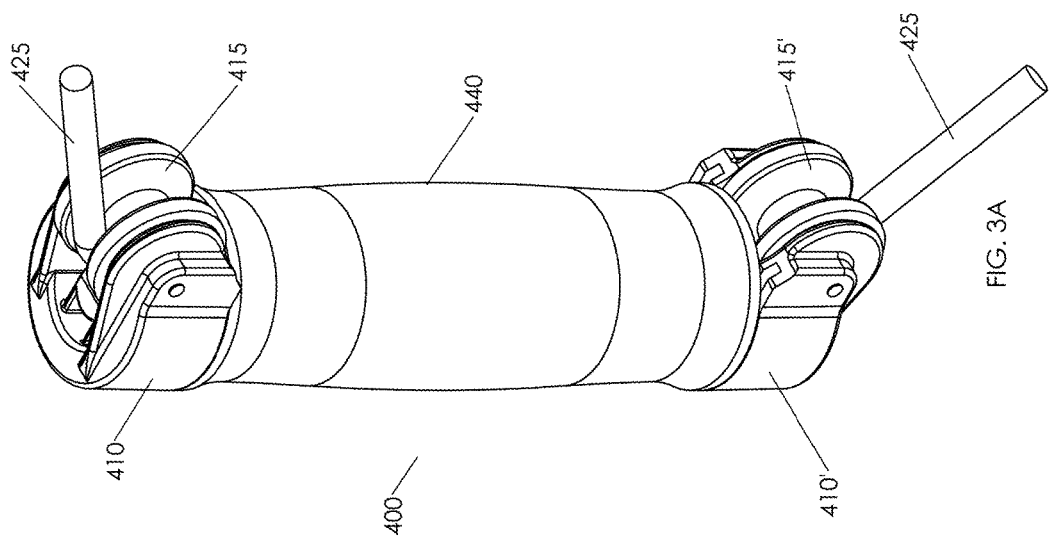

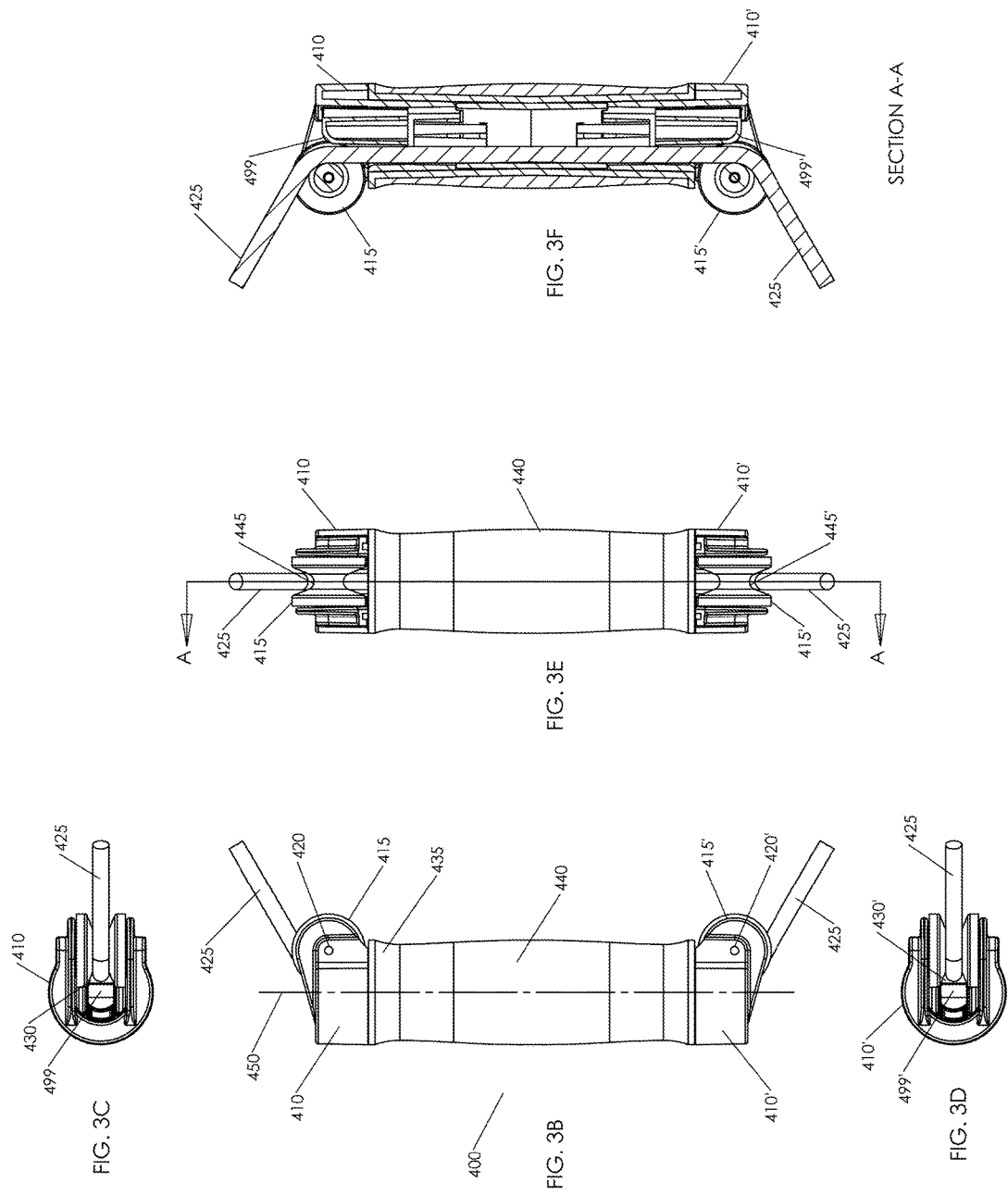

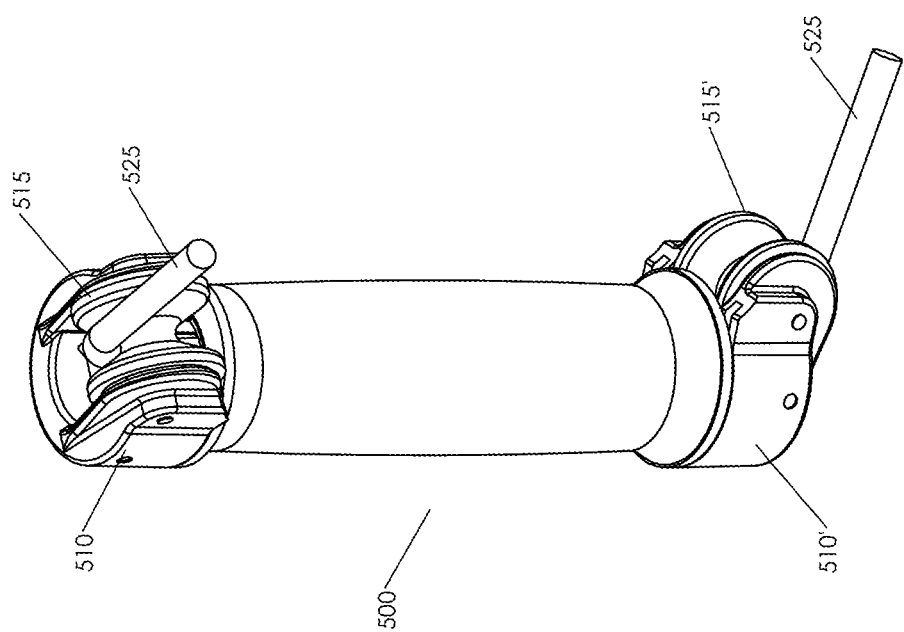

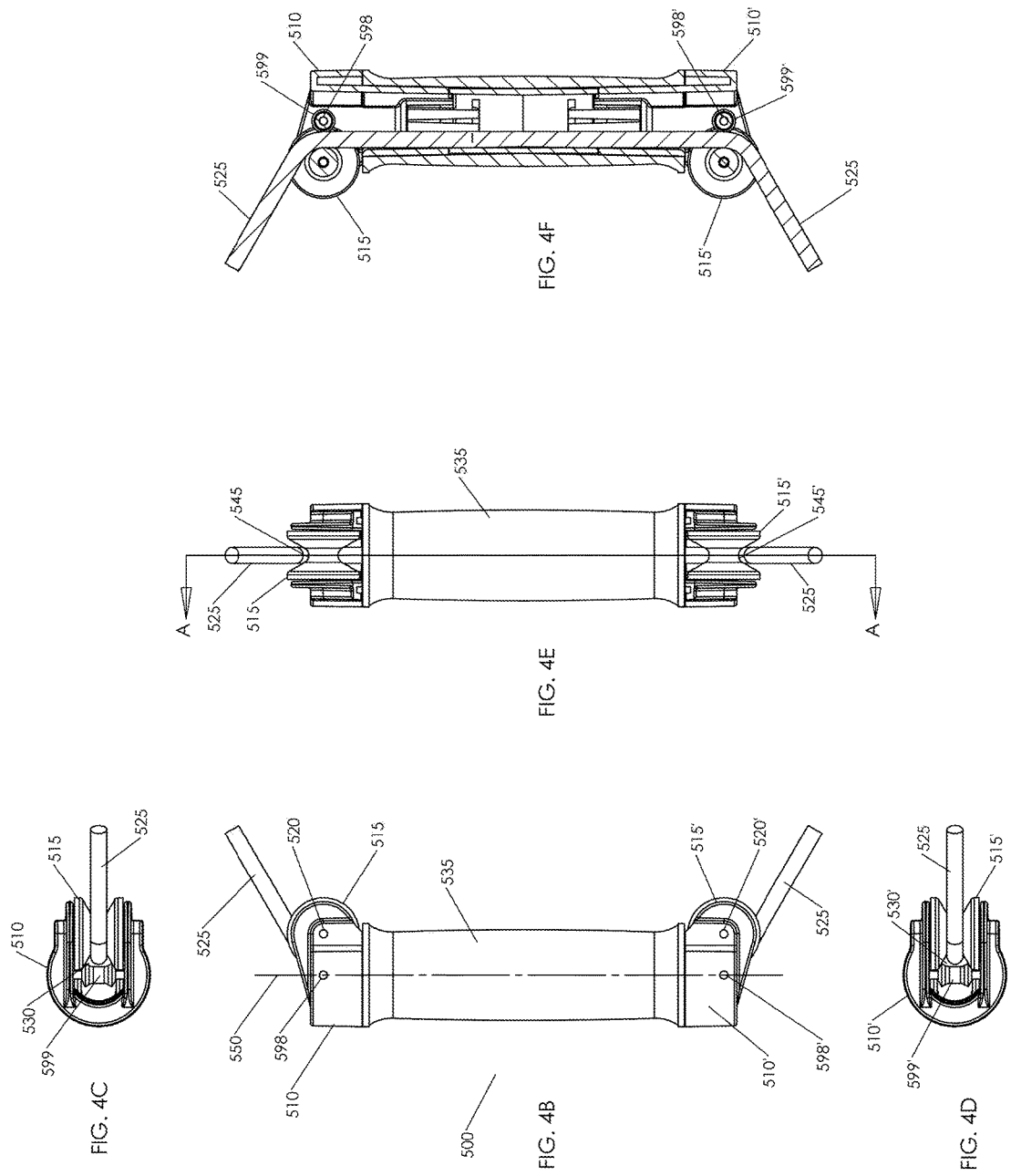

HANDLE

CROSS REFERENCE TO RELATED APPLICATIONS

This patent application claims benefit of priority to U.S. Provisional Patent Application No. 62/211,213 titled "Handle" and filed Aug. 28, 2015, which is incorporated herein by reference in its entirety.

FIELD

This invention generally relates to handles, and to apparatus and methods employing the handles. The handles may, for example, be used in exercise apparatus and lifting apparatus.

BACKGROUND

Numerous exercise devices and physical therapy devices exist in which the user works against resistance to strengthen muscles, condition muscles, stretch muscles, exercise joints, and the like. There exists a need for improved handles for use when working against resistance, for example while exercising.

SUMMARY

Described herein are handles, and apparatus and methods utilizing the handles. The handles are coupled to a cord that is attached to fixed objects or loads, and a user employs the handles to work against resistance. The handles can be moved relative to the cord in a smooth continuous motion in a variety of different directions. The handles may be used for fitness equipment, in fitness programs, for physical therapy equipment, and in physical therapy programs to strengthen and/or stretch muscles, to exercise and/or strengthen joints and their surrounding tissues and/or to improve range of motion for joints. The handles may also be used in lifting aids, for lifting or moving heavy objects.

In one aspect, a handle comprises an elongated handle body comprising a top head, a bottom head, and a central bore that extends along a long axis between the top and bottom heads. The top head comprises a top pulley that rotates around a top axis that is substantially perpendicular to the long axis, and a bottom head comprising a bottom pulley that rotates around a bottom axis that is substantially perpendicular to the long axis. In operation, a cord is disposed on a circumferential surface of the top pulley, enters the handle body through a top opening, extends through the central bore, exits the handle body through a bottom opening, and is disposed on a circumferential surface of the bottom pulley. The cord is anchored at both ends to a fixed object or load. The cord may freely translate through the central bore of the handle by engaging the top and bottom pulleys, resulting in smooth motion of the handle relative to the cord.

Any suitable type of cord may be used with the handles. In some variations, the cord is elastic. In some variations, the cord is substantially non-elastic. A cord may be solid or hollow. A cord may have a round cross-sectional shape, an elliptical cross-sectional shape, an oval cross-sectional shape, a square cross-sectional shape, a rectangular cross-sectional shape, or may have a compressed or flat cross-section. Non-limiting examples of cords that may be employed with the handles include: solid core rubber cords, hollow rubber cords, woven cords, cables, single strand ropes, multi-strand ropes, ribbons, bands, belts, and the like.

The ends of the cord may be anchored in any suitable configuration to one or more fixed objects or loads. In some cases, the ends of the cord are anchored at the same location. In other variations, the ends of the cord are anchored at different locations which optionally may be located on different fixed objects or loads. For example, an end of a cord may be configured to be anchored to a wall, a floor, a door frame, a door knob, a rack, a ceiling, a rafter, weight, a weight stack, furniture, a post, a tree, or the like. Optionally, an exercise apparatus may comprise one or more anchoring devices for anchoring at least one end of a cord to a fixed object or load. An anchoring device may be configured to be anchored to any type of fixed object or load, with non-limiting examples including walls, floors, door jambs, door handles, ceilings, rafters, weight stacks, posts, furniture, trees, and the like.

The pulleys used in the handles can be any suitable type of pulley. In some variations, at least one of the top and bottom pulleys comprises a circumferential groove or depression that receives the cord. When the handle is in use, the cord sits in the circumferential groove or depression and moves along the circumferential groove as the pulley rotates. In some variations, both the top and bottom pulleys comprise a circumferential groove or depression to receive the cord. In some variations, at least one of the top and bottom pulleys has a non-grooved circumferential surface, so that the cord moves along the non-grooved circumferential surface as the pulley rotates. In some variations, both the top and bottom pulleys have a non-grooved circumferential surfaces. A groove in the pulley may allow the cord to maintain its position on the cord during use.

The handle body can have any suitable shape appropriate for a user. In some cases, a handle body has a shape of a hollow cylinder. In some cases, a handle body has the shape of a hollow elliptical cylinder, or the shape of a hollow cylinder with an oval cross-section. In some cases, a handle may comprise one or more indentations in an outer surface of the handle body or on an external grip disposed on an outer surface of the handle body to accommodate one or more fingers extending around a circumference of the handle body. In some cases, a handle body is sized appropriately in circumference and/or length for use by a certain user demographic, e.g., a circumferential dimension and/or length between top and bottom heads selected for a typical male, female, or adult or child.

Handles optionally may comprise a grip at least partially covering the handle body. In some cases, a grip may extend around the circumference of the handle body. A grip may be made of any suitable material, have any suitable structure, and have any suitable design features. Non-limiting examples of grip design features include grips that improve a user's ability to grip the handle (e.g., a rubbery or non-slip grip surface), grips that improve a user's comfort (e.g., a thick or padded grip), grips that improve aesthetics or marketability of the handle, and any combination of two or more of the foregoing.

The top and bottom heads may be fixed or movable relative to the handle body. In some cases, both heads are fixed relative to the handle body. In some variations, at least one of the top and bottom heads may rotate relative to the long axis of the handle. In other cases, both heads may rotate relative to the long axis of the handle, but are coupled to one another through the central bore of the handle. In some cases, both heads may rotate independently relative to the long axis of the handle. The ability for the heads to rotate may allow the pulleys to better align with the cord which, in turn, may prevent the cord from disengaging from the pulley during use.

In some variations, a handle may comprise a locking mechanism that in operation locks the position of the cord relative to the handle. Any suitable type of locking mechanism may be used. Non-limiting examples of locking mechanisms include rope ratchets, rope locks, clamping devices, D-ring locks, friction locks, and the like.

Another variation of an exercise apparatus comprises two handles and one cord threaded through both handles. Still another version of an exercise apparatus comprises two handles and two cords, where one cord is threaded through one of the handles, and the other cord is threaded through the other of the handles.

Optionally, an exercise apparatus may comprise or provide access to instructions for use. The instructions for use may be in any form on any suitable media, and may for example be part of an exercise or therapy program. For example, instructions for use may be diagrams or written instructions on paper, one or more CDs or other portable digital information storage media comprising audio, visual, and/or audiovisual instructions for use, videos, in-person demonstrations, one or more applications accessible via computer, smart phone, or other personal computing device, group memberships, and/or links or access to websites, on-line user groups and the like.

Described herein are methods that employ the handles and exercise apparatus described herein. In one aspect, a method for strengthening a muscle or joint uses an exercise apparatus as described herein, and the method comprises moving the handle such that the cord passes through the central bore of the handle while working against a resistance applied by the cord to the handle. In another aspect, a method for stretching a muscle, joint or connective tissue uses an exercise apparatus as described herein, and the method comprises moving the handle such that the cord passes through the central bore of the handle while working against a resistance applied by the cord to the handle. In another aspect, a method for improving mobility of a joint uses an exercise apparatus as described herein, and the method comprises moving the handle such that the cord passes through the central bore of the handle while working against a resistance applied by the cord to the handle. In yet another aspect, a method for improving balance using an exercise apparatus as described herein, and the method comprises moving the handle such that the cord passes through the central bore of the handle while working against a resistance applied by the cord to the handle.

Described herein are lifting apparatus for lifting or moving a load. In one aspect, a lifting apparatus comprises a handle as described herein and a cord. In operation, a first end of the cord is coupled to a load to be moved, and a second end of the cord is anchored. The cord is disposed on a circumferential surface of the top pulley, enters the central bore through the top opening of the handle, extends through the central bore of the handle, exits the central bore through the bottom opening of the handle, and is disposed on a circumferential surface of the bottom pulley. When the cord is placed in tension by applying force to the handle to lift or move the load, the top and bottom pulleys rotate as the cord moves through the central bore. Optionally, a lifting apparatus may comprise one or more coupling devices for coupling one or both ends of the cord to a load to be moved. Any suitable coupling device may be used to couple the cord to the load, with non-limiting examples including straps, hooks, belts, clamps, nets, platforms, and the like.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIGS. 1A-1E shows an example of a handle. FIG. 1A shows a side view, FIG. 1B shows a top plan view, FIG. 1C shows a bottom plan view, and FIG. 1D shows a front view, and FIG. 1E shows a section view of FIG. 1D along section line A-A.

FIGS. 3A-3I show another example of a handle. FIG. 3A shows an isometric view of the handle. FIG. 3B shows a side view, FIG. 3C shows a top plan view, FIG. 3D shows a bottom plan view, and FIG. 3E shows a front view, and FIG. 3F shows a section view of FIG. 3E along section line A-A. FIG. 3G shows an exploded view of a pulley and a head for the handle in FIG. 3A. FIG. 3H shows interior components of the handle of FIG. 3A, without the handle body. FIG. 3I shows an exploded view of the handle of FIG. 3A, and how the handle is assembled.

FIGS. 4A-4H show another example of a handle. FIG. 4A shows an isometric view of the handle. FIG. 4B shows a side view, FIG. 4C shows a top plan view, FIG. 4D shows a bottom plan view, and FIG. 4E shows a front view, and FIG. 4F shows a section view of FIG. 4E along section line A-A. FIG. 4G shows interior components of the handle of FIG. 4A, without the handle body. FIG. 4H shows an exploded view of the handle of FIG. 4A, and how the handle is assembled.

FIG. 6A shows a side view, FIG. 6B shows a front view, and FIG. 6C shows a section view of FIG. 6B along section line A-A.

DETAILED DESCRIPTION

Figure 1F:
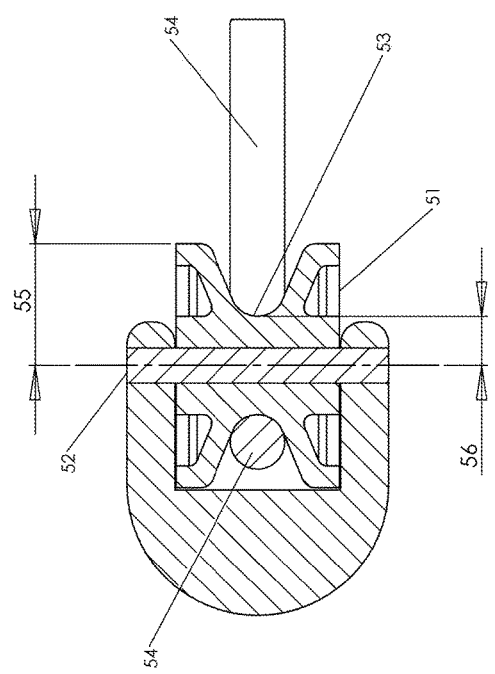
FIGS. 1F-1G shows cross-sectional views of non-limiting examples of pulleys that may be used in the handles described herein.

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used in this specification and the appended claims, the singular forms "a," "an," and "the" include plural referents unless the context clearly indicates otherwise. Also, the term "parallel" is intended to mean "parallel or substantially parallel" and to encompass minor deviations from parallel geometries rather than to require that any parallel arrangements described herein be exactly parallel. The term "perpendicular" is intended to mean "perpendicular or substantially perpendicular" and to encompass minor deviations from perpendicular geometries rather than to require that any perpendicular arrangement described herein be exactly perpendicular. The term "square" is intended to mean "square or substantially square" and to encompass minor deviations from square shapes, for example substantially square shapes having chamfered (e.g., rounded or otherwise truncated) corners. The term "rectangular" is intended to mean "rectangular or substantially rectangular" and to encompass minor deviations from rectangular shapes, for example substantially rectangular shapes having chamfered (e.g., rounded or otherwise truncated) corners. The term "circular" is intended to mean "circular or substantially circular" and to encompass minor deviations from circular shapes. The term "oval" is intended to mean "oval or substantially oval" and to encompass minor deviations from oval shapes. The term "elliptical" is intended to mean "elliptical or substantially elliptical" and to encompass minor deviations from elliptical shapes. The term "cylindrical" is intended to mean "cylindrical or substantially cylindrical" and to encompass minor deviations from cylindrical shapes.

The user grips the handle or attaches the handle to a body part (e.g., hand, foot, finger, toe, arm, or leg). To work against resistance or to move a load, the user moves the handle to apply tension to the cord. The handle comprises an elongated handle body comprising a top head, a bottom head, and a central bore that extends along a long axis between the top and bottom heads. The top head comprises a top pulley that rotates around a top axis that is substantially perpendicular to the long axis, and a bottom head comprising a bottom pulley that rotates around a bottom axis that is substantially perpendicular to the long axis. In operation, a cord is disposed on a circumferential surface of the top pulley, enters the handle body through a top opening, extends through the central bore, exits the handle body through a bottom opening, and is disposed on a circumferential surface of the bottom pulley. Both ends of the cord are anchored to a fixed object or load. When the handle is used to apply tension to the cord, the pulleys support the cord and may rotate around their respective axes to allow translation of the cord through the central bore. The pulleys operate to reduce friction between the cord and the handle. The pulleys facilitate movement of the handle relative to the cord such that as the user works against resistance, the user can move the handle in a smooth motion in a range of different directions and movements without the cord binding, chafing, or catching against the handle.

Referring now to FIGS. 1A-1E, one non-limiting example of a handle is shown. The handle 200 has an elongated handle body 210 with a central hollow bore 220 extending along a long axis 250 of the handle body. A top axle 230 is coupled to a top head 231 of the body 210. A bottom axle 230' is coupled to a bottom head 232 of the body 210. The axles 230, 230' are oriented perpendicularly to the handle body long axis 250. Surfaces 299 and 299' are designed to retain cord 225 in pulleys 205, 205'. A top pulley 205 is coupled to top axle 230 and rotates relative to the handle body by rotating around axle 230, or the pulley may rotate with the axle around an axis along axle 230. A bottom pulley 205' is coupled to bottom axle 230', which rotates relative to the handle body by rotating around axle 230' or by rotating with the axle around an axis along axle 230'. A cord 225 is received by the top pulley 205, enters the central bore 220 of handle body through top opening 233, passes through the central bore 220, exits the central bore through bottom opening 234, and is received by the bottom pulley 205'. In operation, both ends of the cord are anchored, and when the handle is used to apply tension to cord 225 as indicated by arrows 260 and 270, pulleys 205, 205' may rotate as indicated by arrows 262 and 261, respectively, and the cord may translate through the handle body, as indicated by arrows 263 and 273.

The cord may have any suitable construction and any suitable mechanical properties. A cord may be elastic or substantially non-elastic. An elastic cord is a cord that is capable of substantially recovering its original length or shape after being stretched, deformed, compressed or expanded. In some cases, a degree of elasticity of the cord is user-selectable so that the user may control or adjust a degree of resistance. A cord may be selected based on load-bearing capacity, elasticity, shape, material composition, appearance, or any combination of the foregoing. A cord may be solid or may be hollow. A cord may be a unitary cord, or a cord may comprise multiple sections, such as a multi-strand rope or a cable or chain comprising multiple sections or links. Cords may in some cases have an outer coating, jacket, or sheath such as a woven (e.g., cotton or synthetic fiber (e.g., nylon or polypropylene) woven jacket), non-woven polymeric (e.g., polypropylene, polyethylene, or nylon), or rubber outer coating or jacket. In some cases, a cord may comprise a woven jacket that constricts to compress an interior of the cord as the cord is stretched. In some cases, a coating, jacket or sheath protects the cord from UV radiation from the sun or other sources. A cord may have a circular cross-section, an elliptical cross-section, a square shape, a rectangular shape, or a cord may have the form of a belt or strap. In some cases a cord is tubular, such as a rubber tube. Non-limiting examples of cords include solid elastic cords, multi-strand elastic cords, hollow elastic cords, single-strand natural or synthetic ropes, multi-strand natural or synthetic ropes, bands, belts, straps, cables, and chains. If a rubber cord is used, any suitable type of rubber may be used, with non-limiting examples including latex rubber, silicone rubber, neoprene, styrene-butadiene rubber, and nitrile rubber. In some cases, a cord is a Bungee cord or shock cord. In some cases, a cord is a polypropylene or nylon multi-strand rope. In some cases, a cord is a multi-strand rubber (e.g., latex rubber) cord covered by a woven nylon jacket, e.g., a Sport Cord® resistance cord.

Figure 1G:
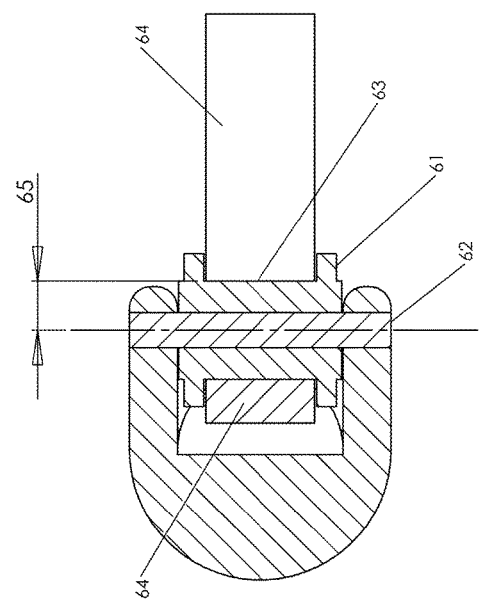

Any suitable type of pulley may be used in the handles. In some variations, at least one of the top and bottom pulleys comprises a circumferential groove or depression that receives the cord. When the handle is in use, the cord sits in the circumferential groove or depression and moves along the circumferential groove as the pulley rotates. In some variations, both the top and bottom pulleys comprise a circumferential groove or depression to receive the cord. In some variations, at least one of the top and bottom pulleys has a non-grooved circumferential surface, so that the cord moves along the non-grooved circumferential surface as the pulley rotates. In some variations, both the top and bottom pulleys have a non-grooved circumferential surface. FIGS. 1F-1G show cross-sectional views of two non-limiting examples of pulleys. FIG. 1F shows a pulley 51 on an axle 52. Axle 52 may be fixed to pulley 51 and rotate with pulley 51, or pulley 51 may rotate around axle 52. Pulley 51 has a circumferential groove or depression 53 to receive a cord 54. Pulley 51 has an outer radius ($R_o$) 55, extending from a center of its axis of rotation along axle 52 to an outer circumferential surface, and an inner radius ($R_i$) 56 extending from a center of its axis of rotation along axle 52 to an inner circumferential surface of groove or depression 53. The depth of the groove or depression may be represented by $R_o - R_i$. The depth of the groove or depression may be any suitable depth. In many cases, a pulley having a circumferential groove or depression such as that illustrated in FIG. 1F may be used with a cord having a round, oval, or elliptical cross-sectional shape. The shape and/or depth of groove or depression 53 may be related to a cross-sectional dimension of the cord. In the case of rotating heads described in FIGS. 3 and 4, a relatively deep groove may allow the pulley to stay better aligned with the cord as the handle is rotated. FIG. 1G shows a pulley 61 on an axle 62. Axle 62 may be fixed or rotating. The circumferential surface 63 of pulley 61 is substantially flat, and cord 64 is disposed on the flat circumferential surface. For example, in the case of a rotatable head or heads, the groove may be deep enough to allow the cord to contact the inner sides of the pulley to align the head to the cord. Pulley 61 has an inner radius ($R_o$) 65. In many cases, a pulley having a substantially flat circumferential surface such as that illustrated in FIG. 1G may be used with a band-like, belt-like or strap-like cord 64. A pulley used in the handles may have any suitable width to radius ratio. In some cases, the width is less than the radius, and in some cases, the width is about the same as the radius, and in some cases, the width is greater than the radius. In the handles, the top and bottom pulleys and axles may be of the same design or may have different designs. Top and bottom pulleys may have the same radii or have different radii. Top and bottom pulleys may have the same widths or have different widths.

In some cases, a bearing is used to reduce friction between the pulley and its axle, or for an axle fixed to a pulley, between the axle and its rotational mount. Any suitable type of bearing may be used. Non-limiting examples of bearings that may be used include bushings, journal bearings, sleeve bearings, ball bearings, spiral groove bearings, and roller bearings. In some cases, a lubricant is used to reduce friction between the pulley and an axle, or between an axle and its rotational mount. Any natural or synthetic, solid, gel-like, or liquid lubricant may be used. In some cases, a pulley and/or axle is made from or coated with a material has a low coefficient of friction against other solids, such as polytetrafluoroethylene (PTFE) or polyethylene.

The handle body can have any suitable shape and size appropriate for its intended application. In some cases, a handle body has the shape of a hollow cylinder. In some cases, a handle body has the shape of a hollow elliptical cylinder, or the shape of a hollow cylinder with an oval cross-section. In some cases, a handle may comprise one or more indentations in an outer surface of the handle body or on an external grip disposed on an outer surface of the handle body to accommodate one or more fingers extending around a circumference of the handle body. In some cases, a handle body is sized appropriately in circumference and/or length for use by a certain user demographic, e.g., a circumferential dimension and/or length between top and bottom heads selected for a typical male, female, or child. The openings through which the cord enters and exits the handle body and the pulleys can be designed to reduce or eliminate contact between the handle body and the cord, or to be shaped such that friction and binding of the cord are reduced. For example, the pulleys can be positioned relative to the openings into the handle body so that the cord is fed directly into the handle body bore without contacting the handle body, or the pulleys can be positioned relative to the handle body so that the cord is fed smoothly into the handle body bore. For example, the opening may have a smooth surface that guides the cord without causing the cord to contact a sharp or rough edge, or to be bent through an acute angle, or to become twisted or kinked, or to become trapped or caught (e.g., in an interstitial space between a pulley and the handle body).

Handles optionally may comprise a grip at least partially covering the handle body. In some cases, a grip may extend around a circumference of the handle body. A grip may be made of any suitable material, have any suitable structure, have any suitable coating, and have any suitable design features. Non-limiting examples of grip design features include grips that improve a user's ability to grip the handle (e.g., a rubbery or non-slip grip surface), grips that improve a user's comfort (e.g., a thick grip, a padded grip, a formable grip, and the like), grips that form to a user's hand, grips that improve aesthetics or marketability of the handle, and any combination of two or more of the foregoing.

The top and bottom heads may be fixed or movable relative to the handle body. In some cases, both heads are fixed relative to the handle body. In some variations, at least one of the top and bottom heads may rotate relative to the long axis of the handle. In other cases, the heads are coupled to one another, but may rotate relative to the long axis of the handle. In some cases, both heads may rotate independently relative to the long axis of the handle. The top head and bottom heads may be separable from or integral with the handle body. In some cases, at least one of the top and bottom heads and the handle body form a unitary article so that the at least one head is not separable from the handle body. In some cases, a coupling is disposed inside the handle body, and the coupling joins together the top and bottom heads. If a coupling is used, it may be configured for movability of a head relative to the handle body. For example, a couple may facilitate rotation of a head relative to a handle body. Non-limiting examples of handles incorporating couplings to connect the top and bottom heads are provided in FIGS. 3A-3I and 4A-4H, which are described in greater detail below.

In some variations, a handle may comprise a locking mechanism that in operation locks the position of the cord relative to the handle. Any suitable type of locking mechanism may be used. Non-limiting examples of locking mechanisms include rope ratchets, rope locks, clamping devices, D-ring locks, friction locks, and the like.

A handle and its components may be made from any suitable materials. In some cases, a handle body, the top and bottom heads, and the pulleys are made from one or more plastics or polymeric materials. In some cases, metal may be used for one or more components. Polymeric materials used in the handles may be thermoplastic polymers or thermosetting polymers. Polymeric materials used in handle components may be selected based on any consideration of manufacture or use. Non-limiting examples of selection criteria include cost, ease of manufacture, hardness, density, UV resistance, heat resistance, stiffness, elasticity, tensile strength, yield, ductility, impact resistance, toughness, coefficient of friction, environmental considerations (recyclability, evidence of toxicity, and the like), Non-limiting examples of suitable polymeric materials that may be used include Polycarbonate, Nylon, Acrylonitrile butadiene styrene (ABS), polytetrafluoroethylene (PTFE), copolymers, and polymeric blends. The polymeric materials used in components of a handle may the same or different. A grip, if used, may be made from a different polymeric material than a handle body. A grip may be formed from or coated with a material that promotes a user grip, e.g., to reduce slipping of the user's hand, wicks away sweat, and/or increases hand comfort while gripping. A grip, for example, may be made from a non-slip rubberized material, a textured material, a porous material, or a foam.

Figure 2B:
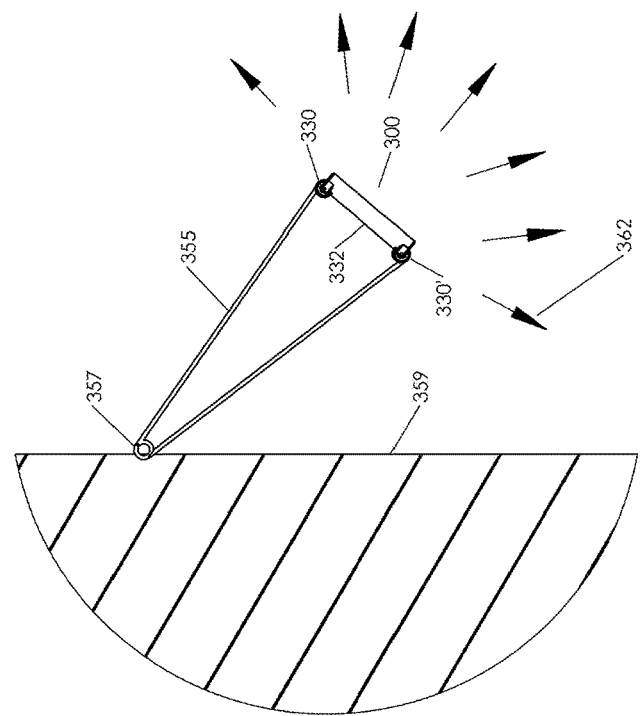
FIGS. 2A-2D show a handle in operation, for example a handle as illustrated in FIGS. 1A-1E, 3A-3I, and 4A-4H.
Figure 2A:
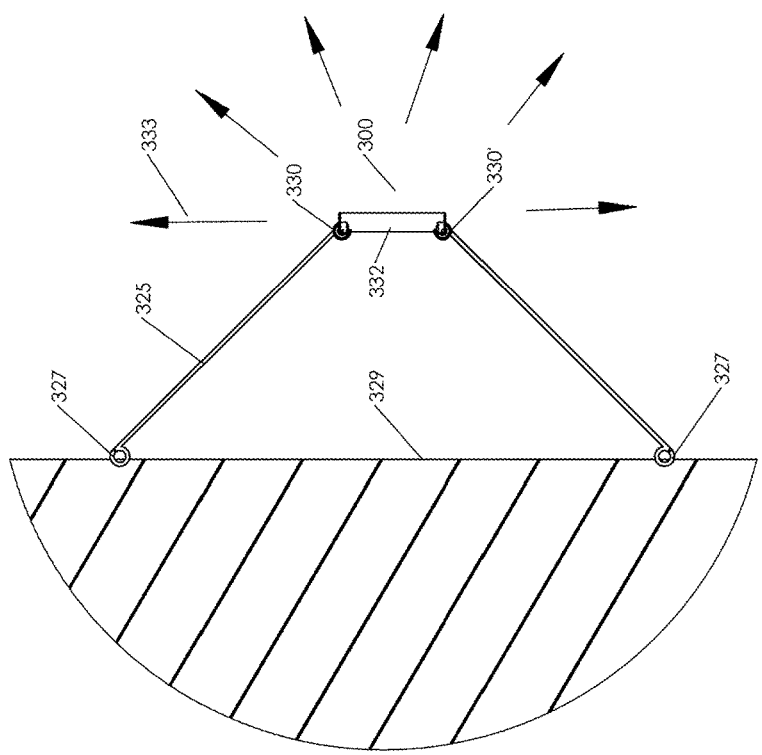

FIGS. 2A-2D illustrate examples of operation of a handle, non-limiting examples of which are illustrated in and described in relation to FIGS. 1A-1E, 3A-3I, and 4A-4H below. Referring first to FIG. 2A, a handle 300 is anchored to a fixed wall or wall-like structure 329 via cord 325. Opposing ends of cord 325 are anchored to the wall 329 at two displaced anchoring positions 327. Although the anchoring positions 327 are illustrated as vertically displaced from one another at positions above and below the handle for this particular example, it should be understood that the anchoring positions may be displaced relative to one another and relative to the handle in any direction. The cord 325 is disposed on a circumferential surface of a top pulley 330, passes through a handle body 332, and is disposed on a circumferential surface of bottom pulley 330'. As the handle moves in a direction keeping tension on the cord (as illustrated by arrows 333), pulleys 330, 330' may rotate to allow the cord to translate through the central bore of the handle resulting in smooth motion of the handle relative to the cord. The rotation of the pulleys around their rotational axes allowing the cord to move relative to the handle greatly reduces or eliminates sliding friction between the cord and the handle.

Referring now to FIG. 2B, a handle 300 is anchored to a fixed wall or wall-like structure 359 via cord 355. Both ends of cord 355 are anchored to the wall 359 at one anchoring position 357. Although the anchoring position 357 is illustrated as vertically displaced relative to the handle 300 for this particle example, it should be understood that the anchoring position 357 may be displaced relative to the handle in any direction. The cord 355 is disposed on a circumferential surface of a top pulley 330, passes through a handle body 332, and is disposed on a circumferential surface of bottom pulley 330'. As the cord is placed in tension by applying force to the handle (as illustrated by arrows 362), the pulleys 330, 330' may rotate to move the cord relative to the handle in a smooth motion. In this configuration, the pulleys may allow the user to adjust handle angle relative to the anchoring position 357 in a smooth motion.

Figure 2D:
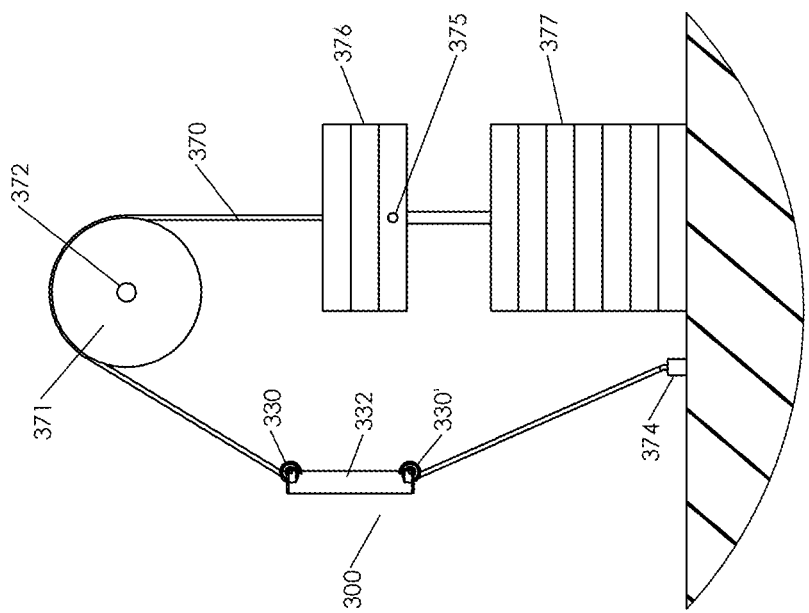
Figure 2C:
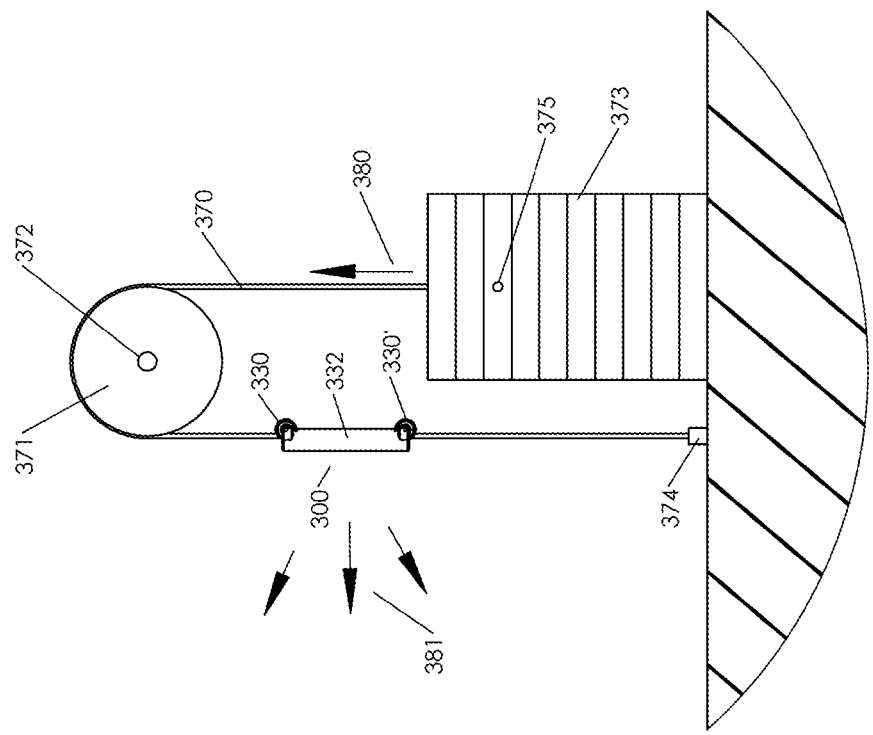

Referring now to FIGS. 2C-2D, the cord 370 is anchored to a weight stack 373 on one end and to mount 374 on the other end. Weight stack 373 comprises a pin 375 whose position determines a portion of the weight stack that will be lifted when tension (indicated by arrow 380) is applied to cord 370. In the particular example illustrated in FIGS. 2C-2D, the position of pin 375 determines that portion 376 of weight stack 373 is lifted by cord 370, whereas weight stack portion 377 is not lifted. The cord 370 extends upward from the weight stack, wraps around a curved surface (which may optionally be a pulley 371 rotating on an axis 372), is disposed on a circumferential surface of a top pulley 330 of handle 300, passes through handle body 332, and is disposed on a circumferential surface of bottom pulley 330'. As the cord is placed in tension by applying force to the handle as illustrated by arrows 381, the weight stack portion 373 shown in FIG. 2D is lifted and the pulleys 330, 330' may rotate to allow the cord to translate through the central bore of the handle in a smooth motion. The rotation of the pulleys around their rotational axes allowing the cord to move relative to the handle greatly reduces or eliminates sliding friction between the cord and the handle.

FIGS. 3A-3I provide another non-limiting example of a handle. The handle 400 comprises a hollow cylindrical handle body 435 and two heads 410, 410' positioned on opposite sides of the handle body. The handle body has a long axis indicated by dashed line 450. Top pulley 415 on axle 420 is coupled to head 410, and bottom pulley 415' on axle 420' is coupled to head 410'. Axles 420, 420' are perpendicular to axis 450. Surfaces 499 and 499' are designed to retain cord 425 in pulleys 415, 415'. In operation, groove 445 of top pulley 415 receives cord 425. Cord 425 enters through a top opening 430 of the top head 410, passes through a central bore of handle body 435, exits through a bottom opening 430' of the bottom head 410' and is received in groove 445' of the bottom pulley 415'. As the cord 425 is placed in tension by displacing the handle 400, the pulleys may rotate, allowing the cord to move relative to the handle 400. For example, in the case the ends of cord 425 are mounted as in FIG. 2A and the cord is engaged with the pulleys, the pulleys would rotate if the handle was moved in the vertical direction. Optionally, the handle 400 comprises an external grip 440. Grip 440 may be disposed on all or a portion of the external surface of handle body 435. In some cases, grip 440 extends circumferentially completely around the handle body 435, and in other cases, grip 440 extends circumferentially only partially around the handle body 435. In some cases, a grip 440 is fixed relative to a surface of handle body 435, and in other cases a grip is movable relative to the handle body.

Figure 3I:
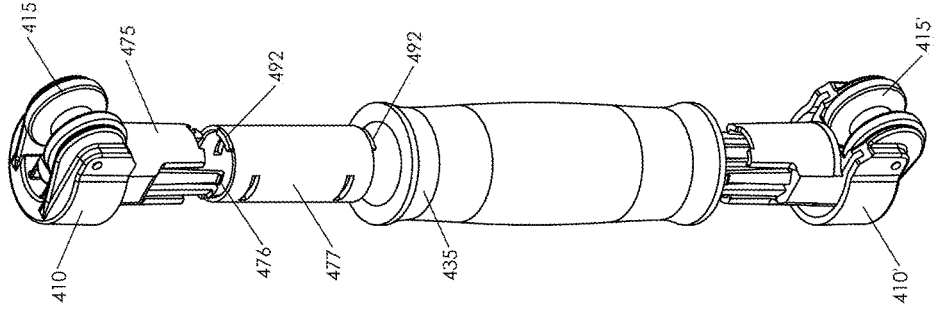
Figure 3H:
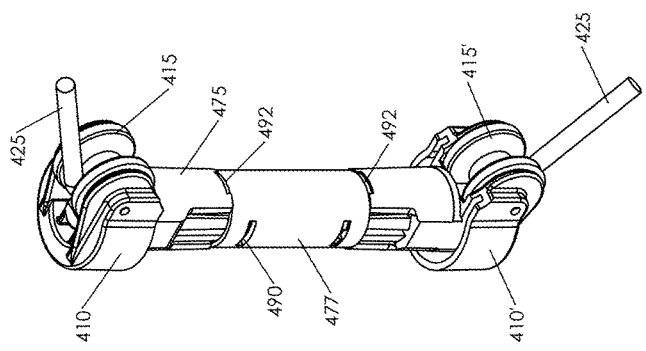
Figure 3G:
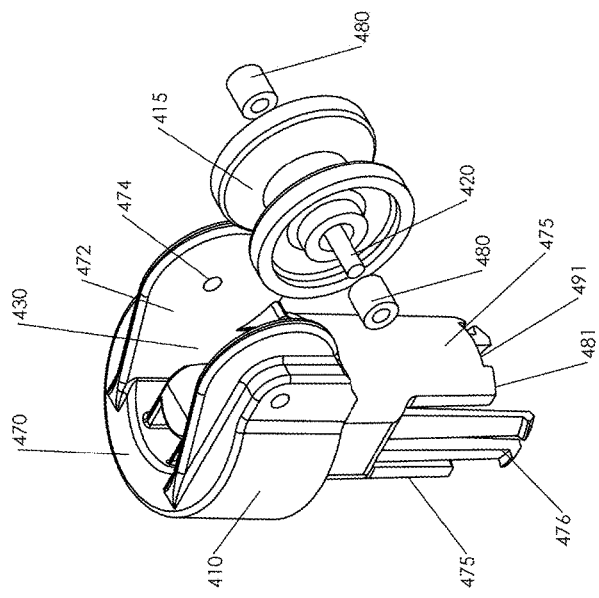

FIG. 3G provides an exploded view of the top head assembly 410 of the handle 400 shown in FIGS. 3A-3F. Head 410 comprises recess 472 configured to receive pulley 415 and includes holes 474 configured to receive axle 420. In this particular example, sleeve bearings 480 are disposed between pulley 415 and axle 420. The head 410 comprises an opening 430 that extends along axis 450 and is open to upper surface 470, to lower surface 481, and to recess 472. Head 410 comprises two opposing bearing surfaces 475 with rotational locking slots 491. Disposed between and parallel to opposing bearing surfaces 475 is at least one locking tab 476.

FIG. 3H shows the handle 400 without the handle body 435 or grip 440. In this example, top head 410 and bottom head 410' are rotationally fixed to one another through coupling 477. Locking tabs 476 in head 410 engage slot 490 in coupling 477 locking the parts together axially. Slot 491 in head 410 engages tab 492 in coupling 477 preventing rotation between the coupling and heads. As shown in FIG. 3H, bottom head 410' is coupled to coupling 477 in a similar manner. This assembly may rotate freely in handle body 435.

FIG. 3I shows an exploded view of the handle 400. The top head assembly shown in FIG. 3G is locked into coupling 477 prior to sliding into handle 435. A second bottom head assembly is then slid into the opposite end of handle 435 and locked into coupling 477. In the case that the handle body 435 is rotated by the user relative to the orientation of cord 425, the side load of cord 425 on grooves 445, 445' of pulleys 415, 415' may assist the pulleys to maintain alignment and engagement with the cord insuring smooth operation of the handle during both rotation and translation of the handle relative to the cord. In addition, the offset of the axis of pulleys 415, 415' from the central axis 450 will create a lever effect which will allow the side load of the cord 425 on the pulley 415 to rotate the heads 410, 410' relative to the handle body 435.

Figure 4H:
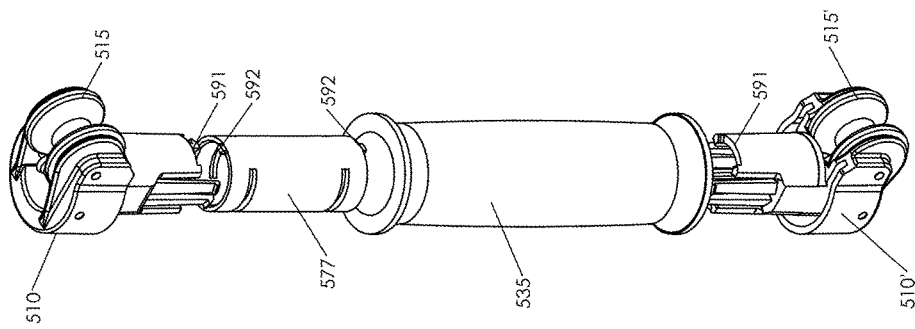

FIGS. 4A-4H provide another non-limiting example of a handle. The handle 500 in FIG. 4A shows heads 510, 510' rotated independently. The handle 500 comprises a hollow cylindrical handle body 535 and two heads 510, 510' positioned on opposite sides of the handle body. The handle body has a long axis indicated by dashed line 550. Top pulley 515 on axle 520 is coupled to head 510, and bottom pulley 515' on axle 520' is coupled to head 510'. Axles 520, 520' are perpendicular to axis 550. Rollers 599 and 599' are designed to retain cord 525 in pulleys 515, 515'. Rollers 599, 599' rotate on shafts 598, 598'. Shafts 598.598' are coupled to heads 510, 510'. In operation, groove 545 of top pulley 515 receives cord 525. Cord 525 enters through a top opening 530 of the top head 510, passes through a central bore of handle body 535, exits through a bottom opening 530' of the bottom head 510' and is received in groove 545' of the bottom pulley 515'.

Figure 4G:
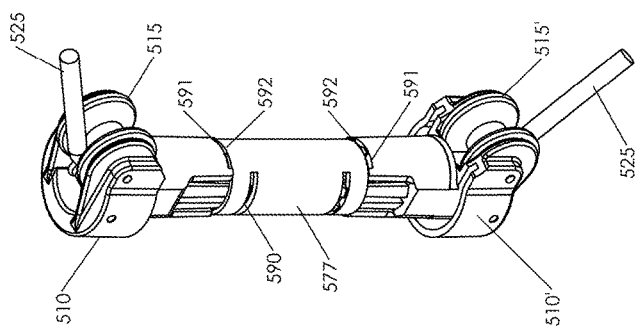

FIG. 4G show the handle 500 without the handle body 535. In this example, top head 510 and bottom head 510' are coupled to one another through coupling 577, but maintain a limited degree of rotational freedom. As is the example in FIGS. 3A-3I, locking tabs in head 510 engage slot 590 in coupling 577 locking the parts together axially. As shown in FIG. 4G, bottom head 510' is coupled to coupling 577 in a similar manner. In contrast to the example in FIGS. 3A-3I, tab 592 on coupling 577 has clearance to rotate within the confines of slot 591. This entire assembly may rotate freely in handle body 535.

FIG. 4H shows an exploded view of the handle 500. As in the example in FIGS. 3A-3I, the top head assembly is locked into coupling 577 prior to sliding into handle 535. A second bottom head assembly is then slid into the opposite end of handle 535 and locked into coupling 577. In the case that the handle body 535 is rotated by the user relative to the orientation of cord 525, the side load of cord 525 on grooves 545, 545' of pulleys 510, 510' may independently assist the pulleys to maintain alignment and engagement with the cord insuring smooth operation of the handle during both rotation and translation of the handle body relative to the cord. In addition, the offset of the axis of pulleys 515, 515' from the central axis 550 will create a lever effect which will allow the side load of the cord 525 on the pulley 515 to rotate the heads 510 relative to the handle body 535.

Figure 5:
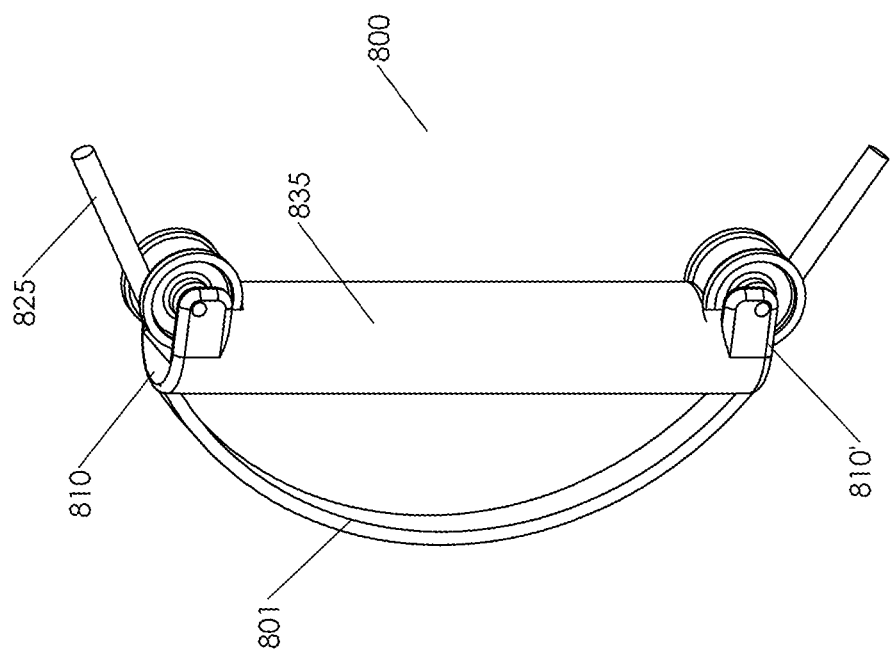
FIG. 5 illustrates an example handle having a strap to enable a user to strap the handle around a hand, foot, arm or leg, etc. so that the user need not actively grip the handle.

FIG. 5 shows an example handle comprising a strap or sleeve that facilitates use of the handle without requiring active gripping by the user. The handle 800 comprises a strap or sleeve 801 that is coupled to the handle body 835 or to an optional external grip. The strap or sleeve may be adjustable or elastic so that it can be secured to a user's foot, ankle, calf, thigh, wrist, forearm, bicep, etc. The cord 825 may freely translate through the central bore of the handle by engaging the top and bottom pulleys, resulting in smooth motion of the handle relative to the cord. Although this particular example shows a strap that extends from a top end 810 to a bottom end 810' of handle 800, other variations are contemplated in which a strap extends from the handle in any direction.

Figure 6C:
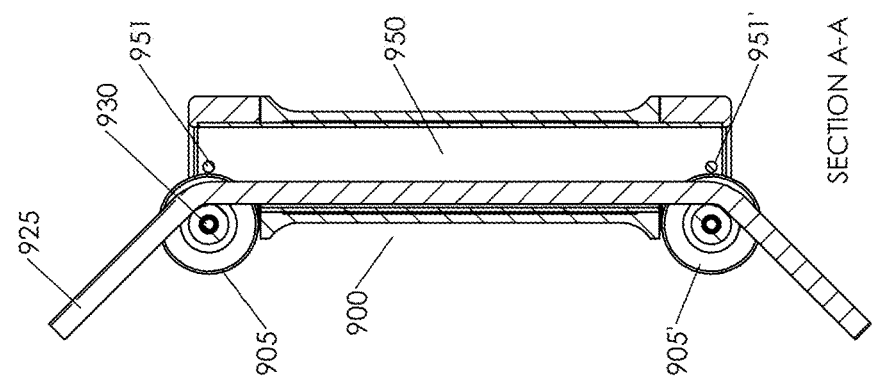
FIGS. 6A-6C show an additional non-limiting example of a handle.
Figure 6B:
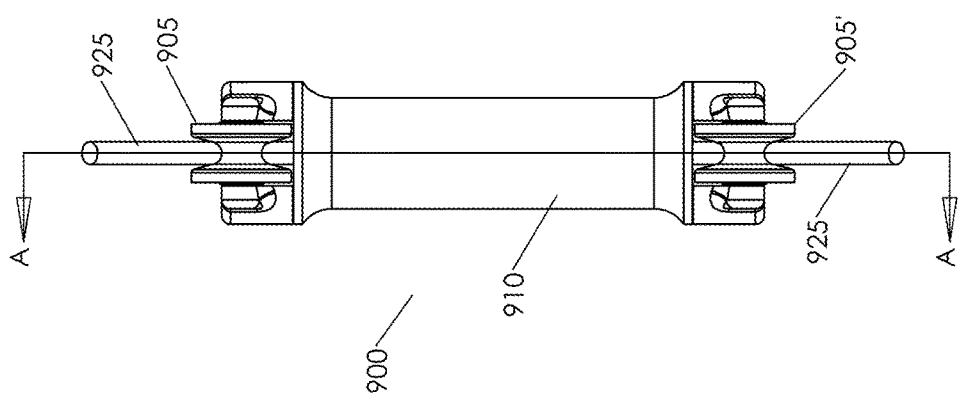
Figure 6A:
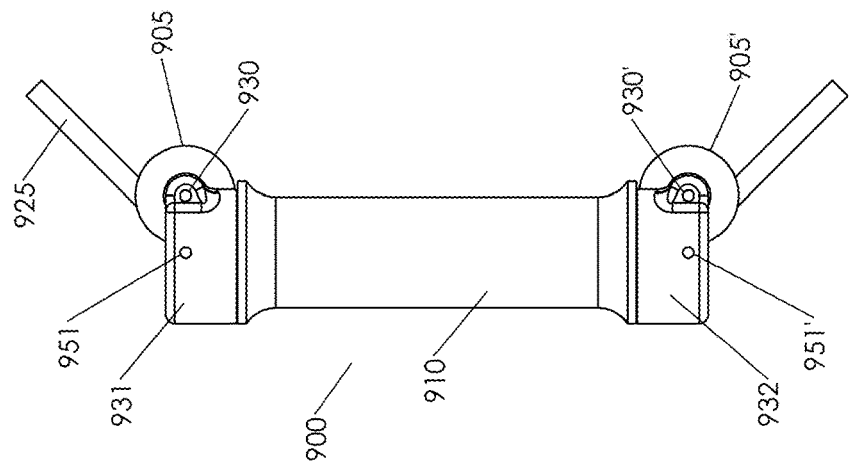

Referring now to FIGS. 6A-6C, a non-limiting example of a handle is shown with a central tube connecting the top and bottom heads. The handle 900 has an elongated handle body 910 with a central hollow bore extending along a long axis of the handle body. A top axle 930 is coupled to a top head 931. A bottom axle 930' is coupled to a bottom head 932. The axles 930, 930' are oriented perpendicularly to the handle body long axis. A tube 950 is attached to both top head 931 and bottom head 932 by way of pins 951 and 951'. Pins 951 and 951' also serve to retain cord 925 in pulleys 905, 905'. Handle body 910 is free to rotate relative to tube 950 and attached heads 931 and 932.

In some cases, a rotatable head may be locked by a user so that it does not rotate.

The handles as described herein may be used in a variety of exercise programs and physical therapy treatments to rehabilitate weak muscles, strengthen muscles, stretch muscles and/or connective tissues, to regain joint function, to exercise joints, to stretch tissues surrounding joint, to strengthen muscles surrounding joints, and to restore balance. The smooth motion of the handle relative to the cord facilitates a user working against resistance in a variety of motions. The handles may be used in a variety of configurations and motions that will enable the user to isolate or concentrate on specific muscles, muscle groups, or joints. In some cases, a user may use two handles at once. In some cases, two handles may be operated on a single cord. For example, a user may grip a handle in each hand, and both handles may be threaded onto a single cord to lift a single load, as described in relation to FIGS. 2C-2D. In other cases, a user may employ two handles, where a first cord is threaded through the first handle and a second cord is threaded through the second handle. The user may use two handles to work against resistance to simulate exercises using coordinated motions of both arms, such as cross-country skiing or swimming. For example, simulating a swimming motion using two handles and two cords may be useful for dry land training for swimming, or to regain or improved shoulder joint function. The user may not even need to actively grip the handles to use them. For example, a handle can be strapped to a foot or leg to allow a user to exercise leg muscles or leg joints, or strapped to a wrist or arm to allow a user to exercise arm muscles or arm or shoulder joints. One example of an exercise program or physical therapy treatment that may benefit from the use of the handles and exercise apparatus described herein is Proprioceptive Neuromuscular Facilitation (PNF). In PNF, the body's proprioceptive system is used to facilitate or inhibit muscle contraction to improve active and passive range of motion.

The handles may be sized and designed for use by particular demographics. For example, handles sized in length and grip size specifically for men, women and children may be provided.

Described herein are exercise apparatus. An exercise apparatus comprises a handle as described herein, and a cord. During use, the cord is threaded through the handle in the following manner. The cord is disposed on a circumferential surface of the top pulley, enters the central bore of the handle body through the top opening of the handle, extends through the central bore of the handle, exits the central bore through the bottom opening of the handle, and is disposed on a circumferential surface of the bottom pulley. During operation, the ends of the cord are anchored to a fixed object or a load. In some cases, the ends of the cord are anchored at the same location on the same object or load, and in some cases, the ends of the cord are anchored at different locations, which may be on the same object or load, or on different objects or loads. During operation, when tension is applied to the cord, the top and bottom pulleys rotate as the cord moves through the central bore. In some variations, an exercise apparatus comprises two handles and one cord threaded through both handles, with the cord threaded through each handle as described above. Still another version of an exercise apparatus comprises two handles and two cords, where one cord is threaded through one of the handles, and the other cord is threaded through the other of the handles. The ends of the two cords may be anchored at the same or different locations, which may located on the same object or on different objects. The exercise apparatus may be configured to be anchored to any available or suitable fixed object or load. Non-limiting examples include walls, floors, door jambs, racks, door handles, ceilings rafters, weight stacks, posts, furniture, trees, and the like. Optionally, an exercise apparatus may comprise one or more anchoring devices for anchoring at least one end of a cord to a fixed object or load. An anchoring device may be configured to anchor one or more cord ends to any type of fixed object or load. For example, an anchoring device may be configured to anchor one or more cord ends to a wall, floor, door jamb, rack, door handle, ceiling, rafter, weight stack, post, furniture, tree, and the like. Optionally, an exercise apparatus may comprise or provide access to instructions for use. The instructions for use may be in any form on any suitable media, and may for example comprise part of an exercise or therapy program. For example, instructions for use may be diagrams or written instructions on paper, one or more CDs or other portable digital information storage media comprising audio, visual, and/or audiovisual instructions for use, videos, in-person demonstrations, one or more applications accessible via computer, smart phone, or other personal computing device, group memberships, and/or links or access to websites, on-line user groups and the like.

Described herein are methods that employ the handles and exercise apparatus described herein. In one aspect, a method for strengthening a muscle or joint uses an exercise apparatus as described herein, and the method comprises moving the cord through the central bore of the handle while working against a resistance applied to the cord. In another aspect, a method for stretching a muscle, joint or connective tissue, uses an exercise apparatus as described herein, and the method comprises moving the cord through the central bore of the handle while working against a resistance applied to the cord. In another aspect, a method for improving mobility of a joint uses an exercise apparatus as described herein, and the method comprises moving the cord through the central bore of the handle while working against a resistance applied to the cord. In yet another aspect, a method for improving balance using an exercise apparatus as described herein, and the method comprises moving the cord through the central bore of the handle while working against a resistance applied to the cord.

The device may also be used as a lifting apparatus as shown in FIGS. 2C & 2D.

This disclosure is illustrative and not limiting. Further modifications will be apparent to one skilled in the art in light of this disclosure and are intended to fall within the scope of the appended claims.

What is claimed is:

1. A handle comprising:
an elongated handle body having a top head, a bottom head, and a central bore extending along a long axis between a top opening of the top head and bottom opening of the bottom head;
the top head and the bottom head are independently rotatably coupled to the handle body around the long axis;
a top pulley coupled to the top head that in operation rotates around a top axis that is substantially perpendicular to the long axis; and
a bottom pulley coupled to the bottom head that in operation rotates around a bottom axis that is substantially perpendicular to the long axis;
wherein in operation:
a cord having two ends is disposed on a circumferential surface of the top pulley, enters the central bore through the top opening, extends through the central bore, exits the central bore through the bottom opening, and is disposed on a circumferential surface of the bottom pulley;
the cord is anchored at both ends; and
when the handle body is moved, the top and bottom pulleys rotate to allow the cord to translate through the central bore at a variable angle relative to the long axis of the handle body, thereby reorienting the top and bottom heads.

2. The handle of claim 1, wherein at least one of the top and bottom pulleys comprises a circumferential groove or depression that in operation receives the cord.

3. The handle of claim 1, wherein both of the top and bottom pulleys comprise a circumferential groove or depression that in operation receives the cord.

4. The handle of claim 1, wherein at least one of the top and bottom heads is rotatably coupled to the handle body around the long axis.

5. The handle of claim 1, wherein the top head and the bottom head are fixed to one another and rotatably coupled to the handle body around the long axis.

6. The handle of claim 1, wherein the top and bottom heads are fixed relative to the handle body.

7. The handle of claim 1, wherein the handle body has a hollow cylindrical shape.

8. The handle of claim 1, configured for use with an elastic cord.

9. The handle of claim 1, configured for use with a substantially non-elastic cord.

10. The handle of claim 1, configured for use with a cord having a solid round cross-section.

11. The handle of claim 1, configured for use with a cord having a flat cross-section.

12. The handle of claim 1, comprising a locking mechanism that in operation locks a position of the cord.

13. The handle of claim 12, wherein the locking mechanism comprises a ratchet.

14. The handle of claim 1, comprising a grip at least partially covering the handle body.

15. The handle of claim 1, comprising a strap configured to strap the handle to a user's limb or other appendage.

16. An exercise apparatus comprising:
a handle as in claim 1; and
a cord having a first end and a second end, wherein in operation the first and second ends of the cord are anchored to one or more fixed objects or loads, the cord is disposed on a circumferential surface of the top pulley, the cord enters the central bore through the top opening of the handle, the cord extends through the central bore of the handle, the cord exits the central bore through the bottom opening of the handle, and the cord is disposed on a circumferential surface of the bottom pulley, and when the handle is moved, the top and bottom pulleys may rotate to allow the cord to translate through the central bore.

17. The exercise apparatus of claim 16, wherein the first and second ends of the cord are anchored at the same location on a fixed object or load.

18. The exercise apparatus of claim 16, wherein the first and second ends of the cord are anchored at different locations on one or more fixed objects or loads.

19. A lifting apparatus comprising:
a handle as in claim 1; and
a cord;
wherein in operation a first end of the cord is coupled to a load to be lifted or moved, the second end of the cord is anchored, the cord is disposed on a circumferential surface of the top pulley, enters the central bore through the top opening of the handle, extends through the central bore of the handle, exits the central bore through the bottom opening of the handle, and is disposed on a circumferential surface of the bottom pulley, and when tension is applied to the cord by moving the handle to lift or move the load, the top and bottom pulleys rotate as the cord moves through the central bore.

* * * * *